United States Patent [19]
Gilbreath et al.

[11] Patent Number: 6,154,299
[45] Date of Patent: Nov. 28, 2000

[54] MODULATING RETROREFLECTOR USING MULTIPLE QUANTUM WELL TECHNOLOGY

[75] Inventors: G. Charmaine Gilbreath, Accokeek; Steven R. Bowman, Galesville; William S. Rabinovich, Silverspring, all of Md.; Charles H. Merk, Alexandria, Va.; H. E. Senasack, Davidsonville, Md.

[73] Assignee: The United States of America as represented by the Secretary of the Navy, Washington, D.C.

[21] Appl. No.: 09/094,635

[22] Filed: Jun. 15, 1998

[51] Int. Cl.[7] .................................................. H04B 10/00
[52] U.S. Cl. ..................... 359/170; 359/169; 359/167; 359/152; 359/245
[58] Field of Search ..................... 359/169–170, 359/167, 172, 152, 154, 245, 248

[56] References Cited

U.S. PATENT DOCUMENTS

| | | | |
|---|---|---|---|
| 5,020,153 | 5/1991 | Choa et al. | 359/152 |
| 5,093,833 | 3/1992 | Pang et al. | 372/30 |
| 5,117,301 | 5/1992 | Tsumura | 359/154 |
| 5,355,241 | 10/1994 | Kelley | 359/170 |
| 5,479,539 | 12/1995 | Goldsmith et al. | 385/14 |
| 5,608,561 | 3/1997 | Marcuse et al. | 359/161 |
| 5,844,709 | 12/1998 | Rabinovich et al. | 359/248 |
| 5,966,227 | 10/1999 | Dubois et al. | 359/170 |

OTHER PUBLICATIONS

Fritz et al., *Appl. Phys. Lett.* 63(4), Jul. 26, 1993, 494–491.
Gilbreath et al., NRL Memorandum Report NRL/MR/8120–97–9875, *Performance Characteristics of a Retroreflector Array Optimized for LEO Spacecraft*, Dec. 31, 1997.

*Primary Examiner*—Kinfe-Michael Negash
*Attorney, Agent, or Firm*—Barry A. Edelberg; Amy Loch Ressing

[57] ABSTRACT

A system for remote optical communications includes a base station and a remote station. The remote station includes a retroreflector, a multiple quantum well modulator (MQW), and drive circuitry that drives the MQW. A base station transmitter sends an interrogating light beam to the MQW, which modulates the light beam based on the information in the electrical signal from the drive circuitry. The retroreflector reflects the modulated light beam to the base station for detection by a receiver.

20 Claims, 5 Drawing Sheets

MODULATING RETROREFLECTOR USING MULTIPLE QUANTUM WELL TECHNOLOGY

BACKGROUND OF THE INVENTION

1. Field of the Invention

The present invention relates generally to devices for modulating an optical signal and more specifically to retroreflecting devices useful for modulating optical signals.

2. Description of the Background Art

Secure optical communications with satellites or other remote platforms requires that the response to an interrogating light beam be directed back precisely to the source of the light beam. Therefore, the incorporation of a modulated retroreflector, which always reflects light back to its source, into a remote platform was proposed as early as the 1940's. Unfortunately, during the 1940's, materials did not exist to sustain a high data at practicable driver power levels. That is, the drive power levels would dictate payloads comparable in bulk and weight to RF payloads. Since then, ferro-electric liquid crystal (FLC) technology has evolved to provide a potentially low power shutter. FLC modulators, however, modulation rates of only a few kilohertz, which severely limits their bandwidth.

Fritz et al., *Appl. Phys. Lett.* 63(4), Jul. 26, 1993, the entirety of which is incorporated herein by reference, disclose a retroreflecting optical modulator in which the retroreflector is modulated by a Fabry-Perot resonator. Fabry-Perot resonators, however, are highly sensitive to the change in the angle of the source light, as well as changes in temperature.

SUMMARY OF THE INVENTION

Accordingly, it is an object of this invention to optically communicate from with a base station without the need for including a transmitter or a pointing and tracking system in the remote station.

It is another object of the present invention to reduce the amount of remote station power need to optically communicate between a base station and a remote station.

It is a further object of the present invention to provide a compact system capable of high bandwidth optical communications between a base station and a remote station.

It is yet another object of the present invention to provide an optical communications system having a reduced sensitivity to changes in temperature and changes in the angle of the source light.

These and other objects of the invention are accomplished by a system including a base station, and a remote station including a retroreflector, a multiple quantum well modulator, and drive circuitry that drives that multiple quantum well modulator. The base station includes a transmitter that transmits an interrogating light beam. The multiple quantum well modulator, under the control of the drive circuitry, modulates the interrogating light beam. The retroreflector reflects this modulated light beam to the base station, where it may be detected by a receiver.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements, wherein.

DESCRIPTION OF THE PREFERRED EMBODIMENTS

Multiple quantum wells (MQW) are composed of alternating layers of different semiconductor materials. Currently, MQW are produced by growing these alternating semiconductor layers by molecular beam epitaxy or metal oxide chemical vapor deposition. Typical semiconductor materials used include GaAs, AlGaAs, and InGaAs, although others are possible.

Figure 1A:
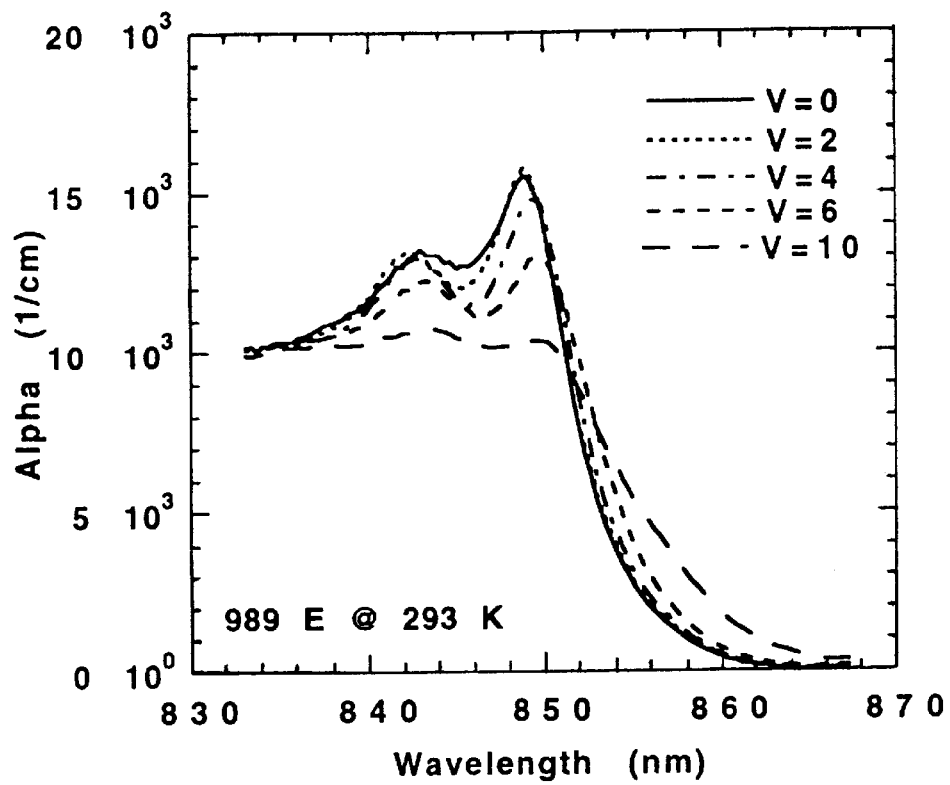
FIG. 1*a* shows a typical quantum well excitonic feature and its dependence on an applied voltage.

The material with the lowest conduction and valence band is called the well while the material with the higher conduction and valence band energy is called the barrier. Semiconductor materials exhibit a band-edge in absorption. At wavelengths longer than the band-edge, the material is transparent, while at shorter wavelengths, it is opaque. At the band edge, these materials exhibit a feature known as exciton. The excitonic feature is generally broad and indistinct at room temperature in normal semiconductor materials. In a quantum well of suitable design, however, this feature becomes much narrower and its exact wavelength becomes a function of the thickness of the semiconductor layers and, most importantly for the present invention, a function of any applied electric fields. A typical quantum well excitonic feature and its dependence on an applied voltage is shown in FIG. 1*a*. The excitonic feature and is both reduced in absorption and shifted to the red by the applied voltage. The relative magnitude of these two effects is determined by the MQW structure and in particular the barrier height and width.

Figure 1B:
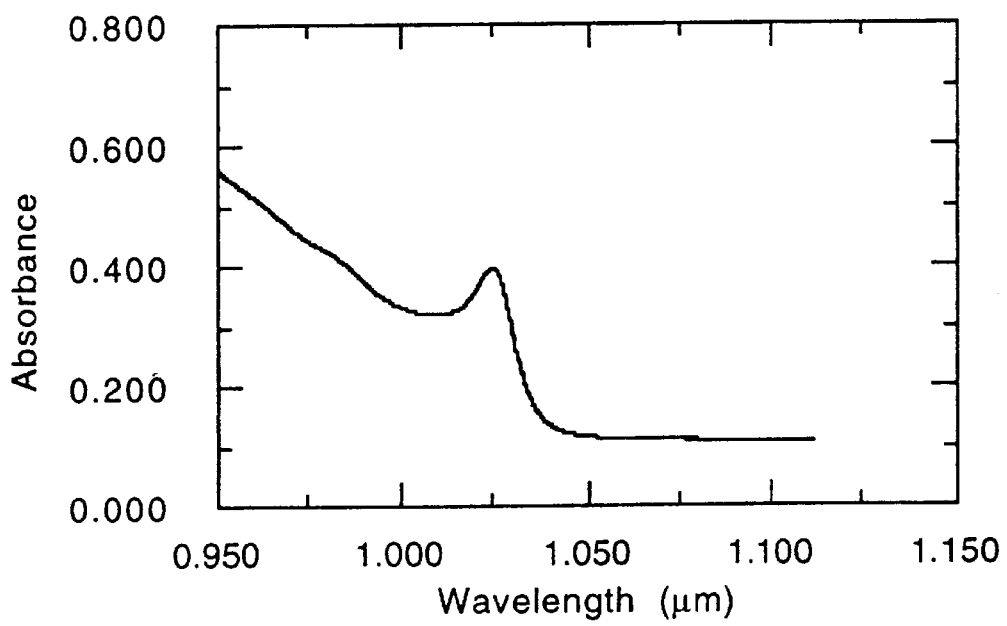
FIG. 1*b* shows the excitonic absorption spectra of an InGaAs quantum well with its exciton at about 1 µm.

Additionally, the optical modulation of the exciton can be tailored to the application. The optical modulation produced occurs in a wavelength near the band-edge of the well material. One micron is a typical laser wavelength used for satellite ranging and communication, suggesting the use of a device composed of InGaAs well. FIG. 1*b* shows the excitonic absorption spectra of an InGaAs quantum well with its exciton at about 1 µm.

The wavelength dependence of the MQW modulation requires some degree of temperature stability for operation. The exact requirements will depend upon the structure and the desired contrast ratio. A crude estimate can be derived from the excitonic spectra. For example, if a ±10% variation in absorption is allowable then, for the InGaAs structure shown in FIG. 1*b*, the band gap may shift by ±3.5 mm. Hence, one would expect temperature stability requirements of about ±12° C. Depending on the operating environment, this stabilization may be achieved using a variety of well-known active and passive thermal engineering techniques. Temperature stability is only needed during operation. MQW modulator devices should survive prolonged exposure to any temperatures below 500° C.

Other techniques may be used instead of temperature stabilization of the MQW modulator device. For example, it is possible to use a broad band or tunable illumination source. Alternatively, a quantum well structure with more than one well width or composition may be used to broaden the excitonic response and make it less sensitive to temperature. This modification would come at the cost or reduced modulation or throughput.

The sensitivity to temperature variations may also be reduced by applying a bias voltage, in addition to the modulation voltage, to the device. This bias voltage would be adjusted depending upon the temperature of the device and would help to compensate for any temperature change-induced shifts of the semiconductor band edge.

The maximum contrast ratio of the modulator depends upon the quantum well structure, the applied field and the thickness of the active layers. It is always possible to increase the contrast ratio of the device by using a thicker structure. Doing so, however, will decrease light transmission through the device.

The advantage of the MQW device technology for an optical transponder is that it is inherently low power and can be very fast. The maximum speed of an MQW modulator is determined, up to the THz rate, by the RC time constant of the device and its driver. For available drivers, and typical MQW structures, speed of about 10 MHz are possible with a square centimeter aperture device. Higher speed devices are possible by using small area devices in a mosaic pattern. The drive voltage for these devices and hence the power required are small. The optical modulators can be designed to be rugged and lightweight.

Figure 2A:
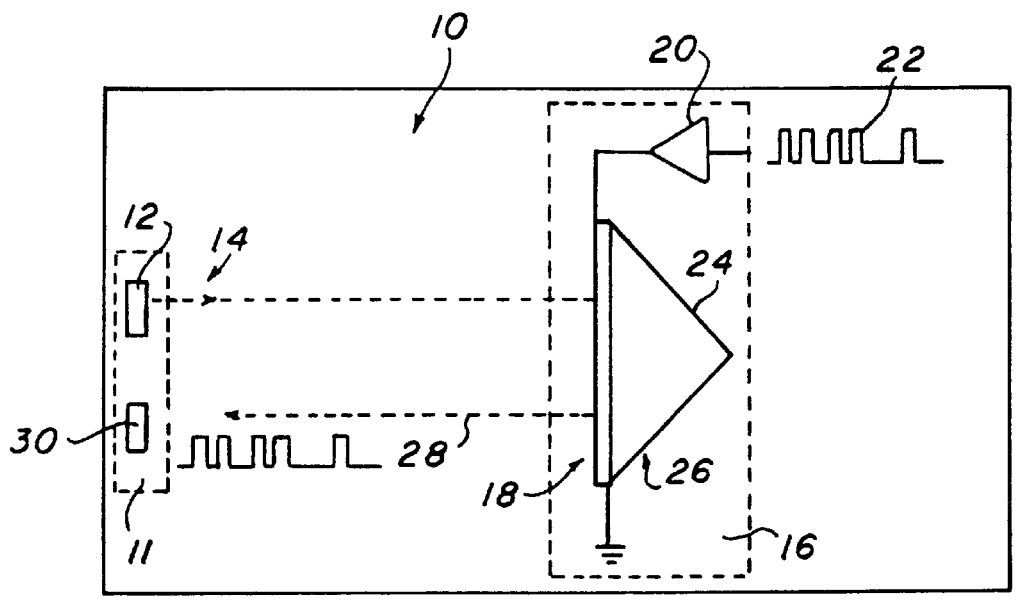
FIGS. 2*a* and 2*b* schematically illustrate two typical embodiments of a retroreflecting modulator according to the present invention.
Figure 2B:
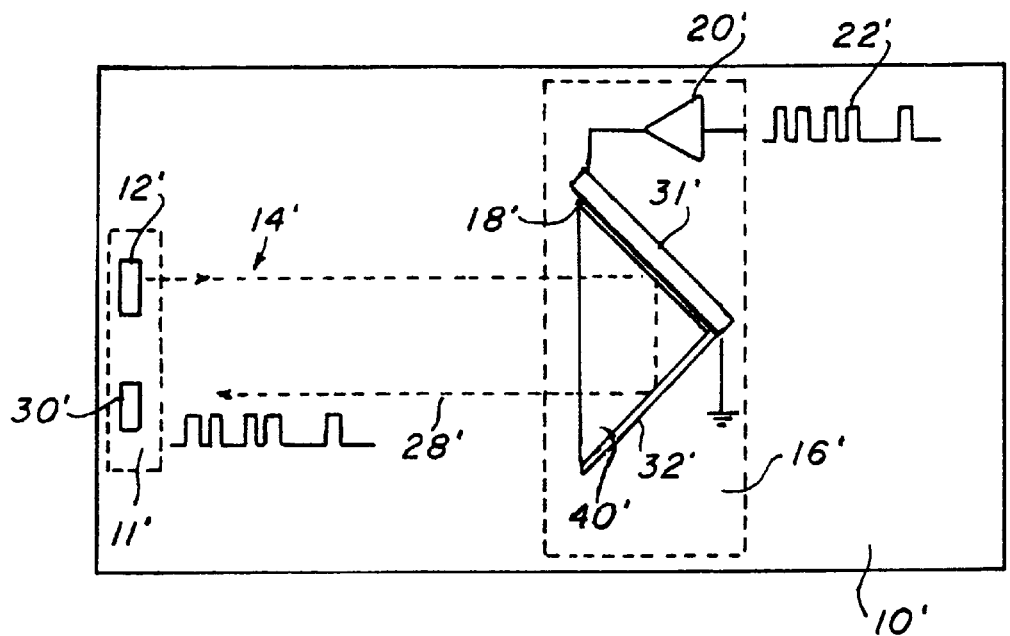

FIGS. 2a and 2b schematically illustrate two typical embodiments of an optical communications system 10, 10' according to the present invention. Throughout this discussion, elements numbered without prime symbols refer to elements in the FIG. 2a embodiment, while elements number with prime symbols refer to the corresponding elements in the FIG. 2b embodiment. At base station 11, 11', transmitter 12, 12' transmits an interrogation beam 14, 14' to remote station 16, 16'. In the FIG. 2a embodiment, interrogation beam 14 passes through transmissive MQW modulator 18. Transmissive MQW modulator 18 is controlled by electronic driver 20, which implies voltages upon MQW modulator 18 corresponding to input signal 22. These voltages cause MQW modulator 18 to shutter the interrogation light passing therethrough, resulting in a modulated interrogation beam 24. The modulated interrogation beam 24 travels into and is reflected from solid retroreflector 26. The reflected modulated beam 28 then travels back through, and is again modulated by, MQW modulator 18, thus reinforcing the original modulation. After passing through MQW modulator 18 this second time, reflected modulated beam 28 travels to receiver 30 at ground station 11.

In the FIG. 2b system, interrogation beam 14' travels to MQW modulator 18'. MQW modulator 18' is grown upon or attached to semiconductor mirror substrate 31' (i.e., a Bragg reflector). MQW modulator 18' is controlled by electronic driver 20', which implies voltages upon MQW modulator 18' corresponding to input signal 22'. The modulated interrogation beam travels through the layers of MQW 18', where they strike and are reflected by semiconductor mirror substrate 31', which forms a first part of a hollow retroreflector 40' mated to MQW 18'. The reflected modulated interrogation beam 28' is reflected to mirror 32', which acts as a second part of the retroreflector. Reflected modulated beam 28' then travels to receiver 30' at base station 11'.

Figure 3:
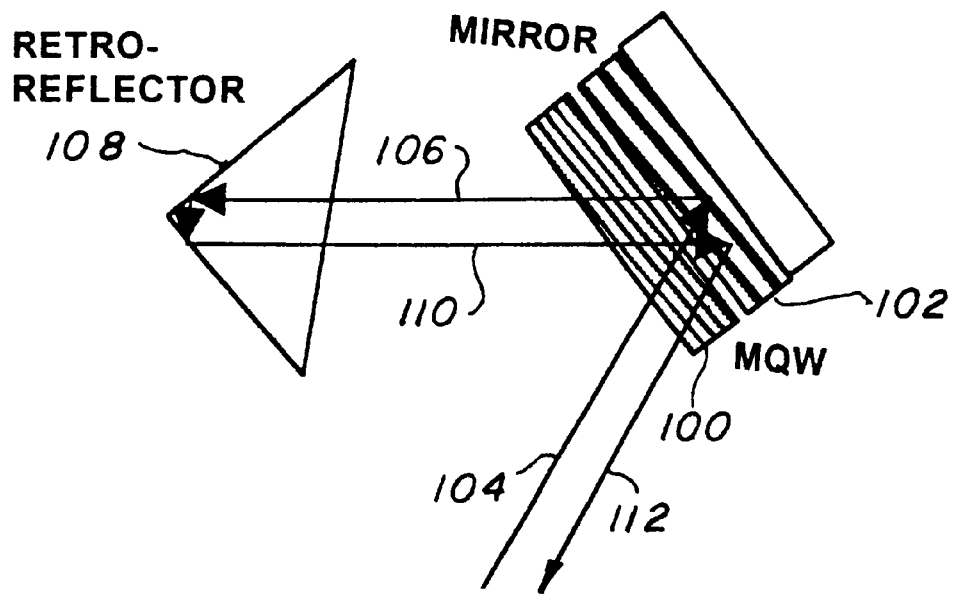
FIG. 3 schematically illustrates another embodiment of a retroreflecting modulator according to the present invention.

FIG. 3 schematically illustrates yet another embodiment of the present invention. Here, MQW modulator 100 is formed on or otherwise attached to a mirrored substrate 102 (Bragg reflector or standard optical). Interrogation beam 104 is modulated while transmitted through MQW modulator 100. The modulated interrogation beam is then reflected by mirror 102 back through MQW modulator 100, which reinforces the original modulation. Twice modulated beam 106 then travels to a corner retroreflector 108, which beam 106 as beam 110 to MQW modulator 100. Beam 110 is transmitted through MQW modulator 100, which once again reinforces the original modulation. Beam 110 then is reflected by mirror 102, as beam 112. From mirror 102, beam 112 passes through MQW modulator 100, which reinforces the original modulation, and then returns to the base station, where it is detected by a receiver (not shown in this figure). Thus, in the FIG. 3 embodiment, the signal is modulated by four passes through MQW modulator 100.

Figure 4:
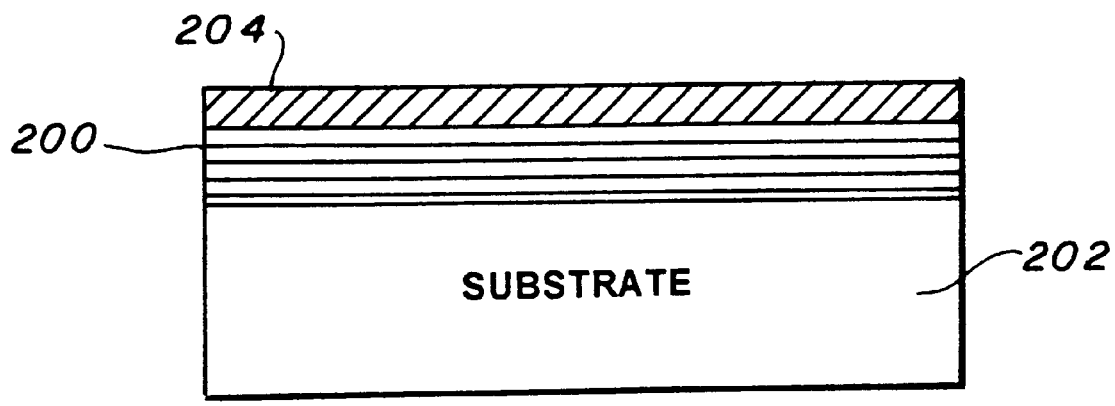
FIG. 4 and FIG. 5 schematically illustrate an alternative substrate/MQW/mirror structure for use in a retroreflecting modulator according to the present invention.

The arrangement of FIGS. 2b and 3 may be modified by substituting the MQW/substrate arrangement shown in FIG. 4. In FIG. 4, MQW 200 is grown on or attached to a substrate 202 that is transparent in the light frequency range at which the device is operated. Back layer 204 is grown on or otherwise attached to the opposing surface of MQW 200, so that MQW 200 is sandwiched between back layer 204 and transparent substrate 200. Back layer 200 is typically a metal layer that serves as both the top electrode for MQW and a reflecting surface of the retroreflector structure. Interrogation light strikes and is transmitted through substrate 202, and is modulated while passing through MQW 200 before striking back layer 200. Back layer 200 reflects light that strikes it back through MQW 200 and substrate 202. The device of FIG. 4 is simple to grow and reduces the resistivity of one electrical contact, thus reducing the drive power and increasing the speed of the device. The FIG. 4 embodiment, however, requires the substrate to be transparent at the operating frequency.

Even though the modulator in a modulating retro system needs only to act as a spatially uniform shutter, there are, in some situations, advantages to segmenting the device into smaller sub-devices. These sub-devices can all be driven with the same modulation signal (though there might be separate drivers for each pixel). Dividing the device allows it to run faster by reducing the RC charging time for each sub-element. It also reduces power consumption. It might also increase reliability. If part of a uniform device is damaged (for example by radiation) in such a way that it shorts, then the whole device will become inoperative. If the device is pixellated and one pixel becomes inactive the damaged pixel can be shut off and the remainder of the device run, albeit with a somewhat reduced contrast ratio.

Making a pixellated device is more difficult than for a conventional electrically-addressed light modulator. Pixellation involves etching regions of the semiconductor for electrical isolation and then running wires to each sub-pixel. Such etching would introduce dead regions and also diffract the incoming beam. Such diffraction is undesirable because it acts as an optical loss. It is possible to isolate sub-pixels with the technique of ion bombardment, which would not introduce diffraction, but this doesn't solve the problem of making efficient electrical contact with each pixel.

Figure 5:
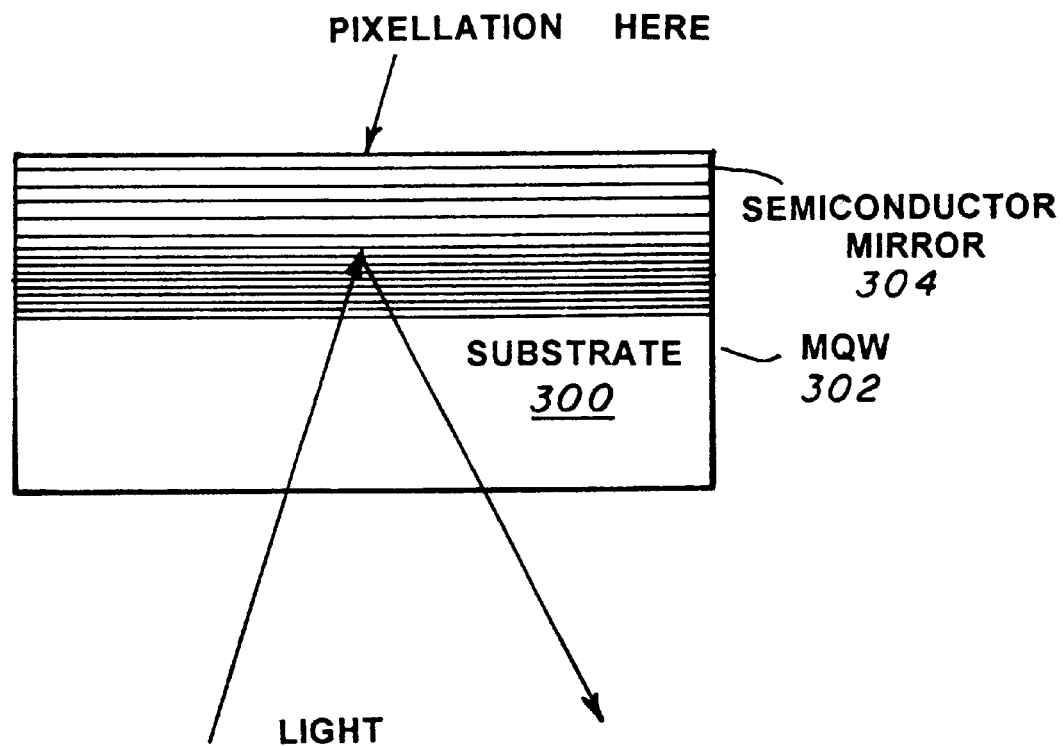

For a pixellated device to work well the wires and etching related to the pixellation must be "hidden" from the optical beam. As shown in FIG. 5, this can be done for wavelengths at which substrate 300 is transparent by growing or attaching to substrate 300 an MQW structure 302 with a semiconductor mirror 304 on top. In this case, light can pass through substrate 300 then through the MQW 302 and then reflects off semiconductor mirror 304. Pixellation is done on this top mirror surface 304, but because the light is nearly fully reflected before reaching top surface 304, the light is not diffracted by the wires and etching (not shown) needed for pixellation. The result is a reflective modulator that can be used in the same optical configurations as shown in FIGS. 2b and 3.

Figure 6:
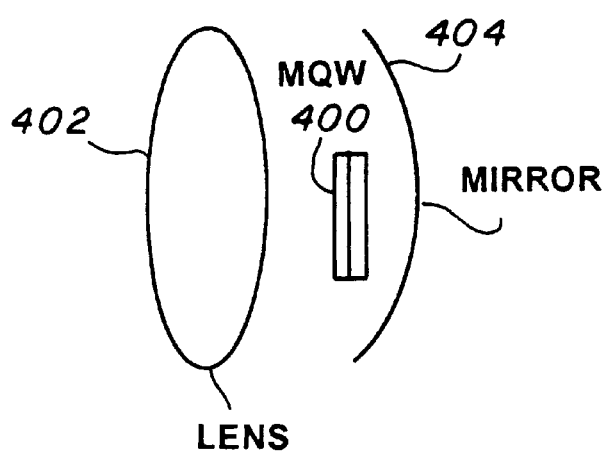
FIG. 6 schematically illustrates the use of a cats eye retro in a retroreflecting modulator according to the present invention.

The speed and power consumption of the quantum well modulator are determined by the resistance and capacitance of the device. One way to reduce capacitance is to use a smaller device. However, in a conventional retro architecture a smaller device would limit the optical aperture of the retro and reduce the optical return. In some cases this is unacceptable. An alternative is to use a cats eye retro (CER). A CER uses a hemispherical lens and a hemispherical mirror to retro reflect a beam. Because there is a lens in the optical aperture the beam is focused. As shown in FIG. 6, by placing MQW 400 between lens 402 and hemispherical mirror 404 one can use a modulator that is smaller than the optical aperture. The simplest configuration uses a single element MQW 400. In this case the size of MQW 400 is determined by the field of view that is required for the retro. While lens 402 can focus the light very tightly, the position of the focal spot will change with incident angle. MQW 400 must be large enough to encompass the entire region where the focused light might fall. Still for a modest (20 degree) field of view a CER can reduce the area needed for MQW 400 by nearly a factor of 10.

A more sophisticated architecture can yield even larger advantages. If one uses a transmissive device in a CER, but now pixellate the device, one need only modulate the element that light falls on at a given time. This can result in very large drops in power consumption. Because a quantum well modulator can also act as an optical detector, by monitoring the current on each element of the modulator when a small bias is applied, one can tell which particular element has light focused on it. In this case, there is no concern over diffraction from the pixellation because the focused beam is smaller than the pixel size.

In each of the embodiments, the optical transponder may be temperature stabilized with a thermo-electric cooler and/or a resistive heater to optimize the contrast ratio for a given operating environment. In addition to or in place of such devices, and as discussed above, a bias voltage may be applied to the device and adjusted to compensate for temperature changes. Incorporation of a photodetector with the modulated retro-reflector or array can allow for secure data transmission. The interrogation beam can be encoded so that data transmission can be restricted to friendly sources.

Figure 7:
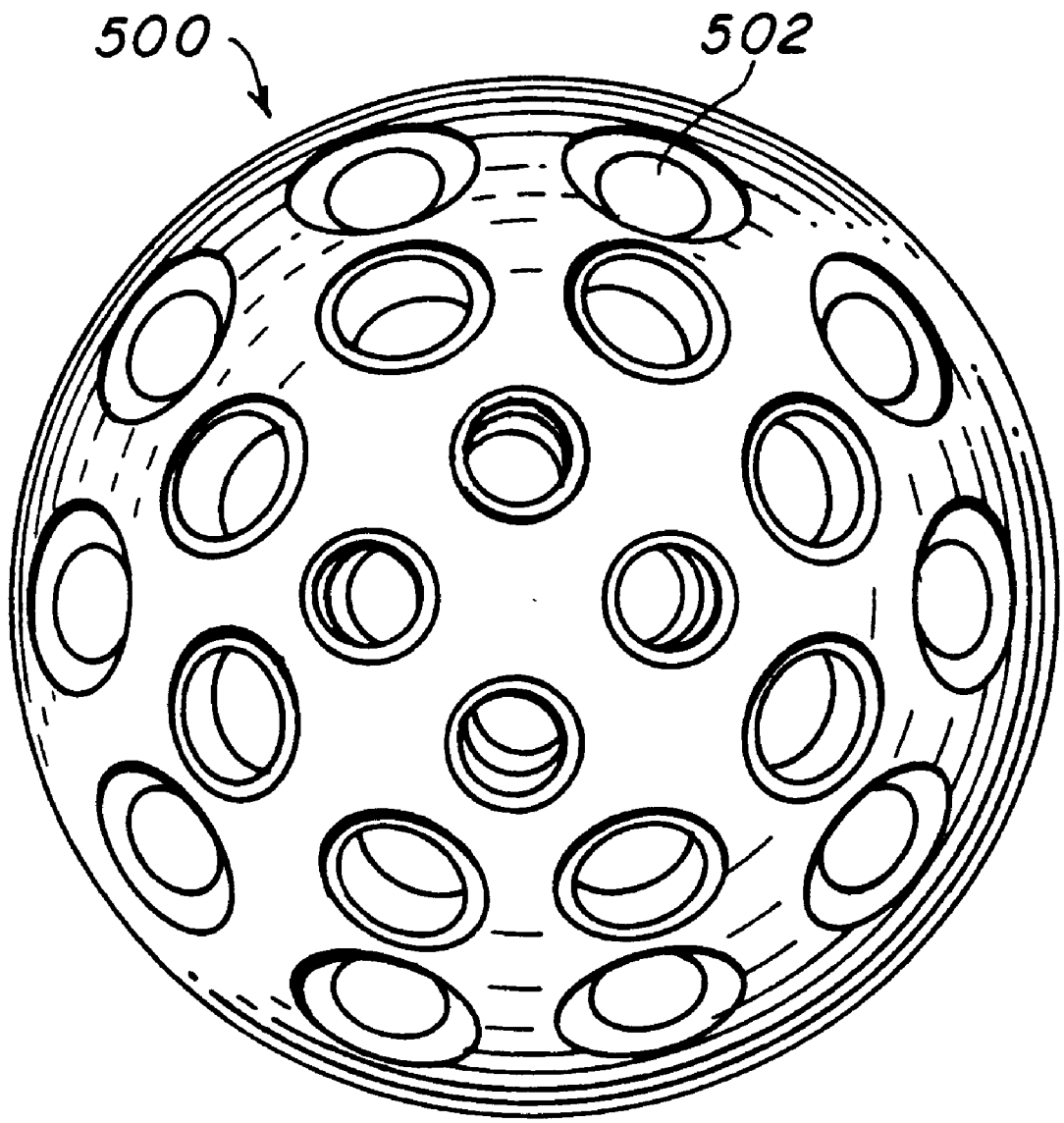
FIG. 7 schematically illustrates an assembly including an array of MQW/retroreflector pairs according to the present invention.

The invention need not be limited to a single modulator-retroreflector pair. An array of modulator-retroreflector pairs, properly configured, can increase the optical return and the field-of-view. In one such configuration, the retroreflectors in the retroreflector array described in Gilbreath et al., "Performance Characteristics of a Retroreflector Array Optimized for LEO Spacecraft", NRL/MR/8120—97-9875, December, 1997 (the entirety of which is incorporated herein by reference), would be replaced with combined modulators/retroreflectors according to the present invention. FIG. 7 shows a retroreflector assembly 500 having recessed therein a plurality of MQW modulator/retroreflector pairs 502. The MQW modulators of pairs 502 are typically under the control of the same or different input signals, depending upon whether one desires all of the MQW modulator/retroreflector pairs to simultaneously provide the same information to all bases stations at all locations.

By coupling MQW technology with optical retroreflectors, optical transponders for secure, high speed data transmission can be produced. Because they do not radiate, these devices require very low power and are less likely to interfere with surrounding equipment than are prior devices. These devices are also compact, low mass, rugged and environmentally stable. They can be powered by conventional electronic circuits, such as TTL logic. These characteristics make these devices ideal for remote data transmission from sensitive or high value platforms, such as satellites and unpiloted airborne vehicles. The invention is particular useful for ground-to-air, ground-to-space, air-to-air, air-to-space, and space-to-space data transmission. In one typical space-to-space application, the base station is a mothership satellite, and the remote station is a microsatellite.

Obviously, many modifications and variations of the present invention are possible in light of the above teachings. It is therefore to be understood that, within the scope of the appended claims, the invention may be practiced otherwise than as specifically described.

What is claimed is:

1. A system for remote signaling, comprising:
 a base station and a remote station, said base station including:
  a receiver; and
  a transmitter which transmits an interrogation light beam to said remote station;
 said remote station including:
  a multiple quantum well light modulator;
  drive circuitry which applies a varying voltage to said multiple quantum well modulator and thereby causes said multiple quantum well modulator to modulate said interrogation light beam by shuttering said interrogation light beam in response to said varying voltage applied to said quantum well modulator, thus producing a modulated light beam; and
  a retroreflector that reflects said modulated light beam to said transmitter.

2. The system of claim 1, wherein said multiple quantum well modulator is oriented so as to modulate said interrogation beam and transmit said modulated interrogation beam to said retroreflector, and wherein said retroreflector is oriented so as to reflect said modulated interrogation beam through said multiple quantum well modulator to said receiver.

3. The system of claim 1, wherein said retroreflector comprises a corner cube retroreflector in which one mirror is Bragg mirror, said Bragg mirror having a front surface forming a substrate for said multiple quantum well modulator, said multiple quantum well modulator being oriented to modulate said interrogation beam and transmit said modulated interrogation beam to said Bragg mirror, said Bragg mirror being oriented to reflect said modulated interrogation beam to another mirror of said retroreflector, said other mirror of said retroreflector being oriented so as to reflect said reflected modulated interrogation beam to said receiver.

4. The system of claim 3, wherein said drive circuitry includes a back surface of said Bragg reflector, said back surface comprising individually controllable elements that each cause said multiple quantum well modulator to modulate a pixel of said interrogation light beam.

5. The system of claim 1, wherein:

said multiple quantum well modulator is transmissive to said interrogation light beam and is supported upon a front surface of a Bragg reflector; and said multiple quantum well modulator is oriented so as to modulate said interrogation light and to transmit said modulated interrogation light to said Bragg reflector;

said Bragg reflector being oriented so as to reflect said modulated transmitted light, through said multiple quantum well, to said retroreflector; and said retroreflector being oriented to reflect said reflected modulated transmitted light through said multiple quantum well modulator to said Bragg mirror, back again through said multiple quantum well modulator, and on to said receiver.

6. The system of claim 5, wherein said drive circuitry includes a back surface of said Bragg reflector, said back surface comprising individually controllable elements that each cause said multiple quantum well modulator to modulate a pixel of said interrogation light beam.

7. The system of claim 1, wherein said multiple quantum well is sandwiched between a reflective metal electrode layer and a transmissive substrate layer, and multiple quantum well is oriented so that said interrogation beam is transmitted through said substrate to said multiple quantum well, whereupon said interrogation beam is transmitted through and modulated by said multiple quantum well, and said modulated interrogation beam is reflected by said reflective metal layer back through said multiple quantum well and said substrate.

8. The system of claim 1, wherein said retroreflector comprises a cats-eye retro, and wherein said cats-eye retro comprises:

a hemispherical lens that focuses said interrogation light beam onto said multiple quantum well;

a hemispherical mirror that reflects said modulated light beam through said multiple quantum well and said hemispherical lens to said receiver.

9. The system of claim 1, wherein said remote station comprises and array of multiple quantum well modulator/retroreflector pairs, each of said retroreflectors reflecting to said receiver light modulated by the multiple quantum well modulator with which it is paired.

10. The system of claim 1, wherein said remote station comprises a stabilizing means for stabilizing to ambient temperature changes the modulation of said interrogation light beam by said multiple quantum well modulator.

11. The system of claim 1, wherein the temperature of said multiple quantum well is stabilized by a heater or a cooler.

12. The system of claim 1, wherein said transmitter includes a broadband or tunable illumination source.

13. The system of claim 1, wherein said multiple quantum well modulator includes a set of quantum wells of a first size or first composition, and a set of quantum wells of a second size or second composition, said first size being different than said second size or composition, said first composition being different than said second composition.

14. The system of claim 1, further comprising biasing circuitry that applies a biasing voltage to said multiple quantum well modulator and adjusts, depending upon the temperature of the multiple quantum well, said biasing voltage.

15. The system of claim 1, wherein said remote station is located in outer space.

16. The system of claim 1, wherein said remote station is an unpiloted airborne vehicle.

17. The system of claim 1, wherein said base station is a mothership satellite and said remote station is a microsatellite.

18. A method of remote signaling, comprising the steps of:

transmitting, to a remote station from a base station, an interrogation light beam, passing said interrogation light beam through a multiple quantum well light modulator at said remote station;

applying a varying, drive voltage to said multiple quantum well modulator, causing said multiple quantum well modulator to modulate said interrogation light beam by shuttering said interrogation light beam in response to said varying drive voltage applied to said quantum well modulator, and thus producing a modulated light beam; and transmitting said modulated light beam to a retroreflector at said remote station that reflects said modulated light beam to a receiver at said base station.

19. The method of claim 18, further comprising the step of stabilizing to variations in ambient temperature said modulation of said interrogation light beam.

20. The method of claim 18, further comprising the steps of applying a biasing voltage to said modulator and varying said applied biasing voltage depending on the temperature of said quantum well modulator so as to stabilize to variations in the temperature of said quantum well modulator said modulation of said interrogation light beam.

* * * * *